T. DOWLING.
Rowlock.

No. 221,914. Patented Nov. 25, 1879.

UNITED STATES PATENT OFFICE.

THOMAS DOWLING, OF GLOUCESTER, MASSACHUSETTS.

IMPROVEMENT IN ROWLOCKS.

Specification forming part of Letters Patent No. 221,914, dated November 25, 1879; application filed April 26, 1879.

*To all whom it may concern:*

Be it known that I, THOMAS DOWLING, of Gloucester, Massachusetts, have invented certain Improvements in Rowlocks; and I do hereby declare that the same are fully described in the following specification and illustrated in the accompanying drawings.

The object of my improvements is to increase the efficiency and durability of rowlocks by means of improved bearings, and to provide means of removing the shank of the fork from the socket without wholly detaching it from the bracket.

My invention consists in the devices and combinations of devices set forth in the appended claims.

Figure 1:
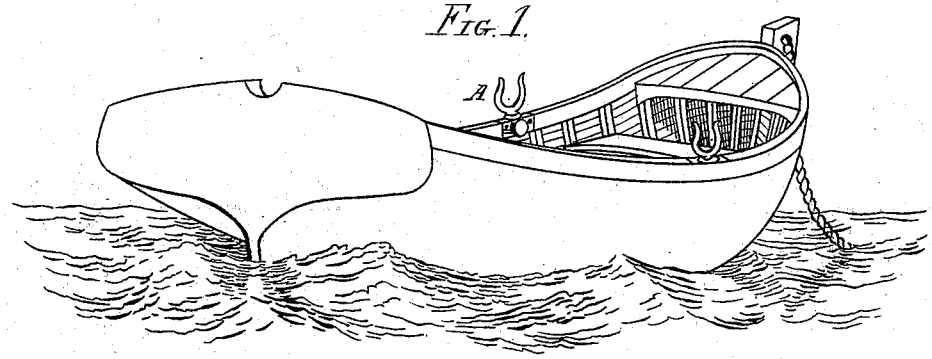
Figure 2:
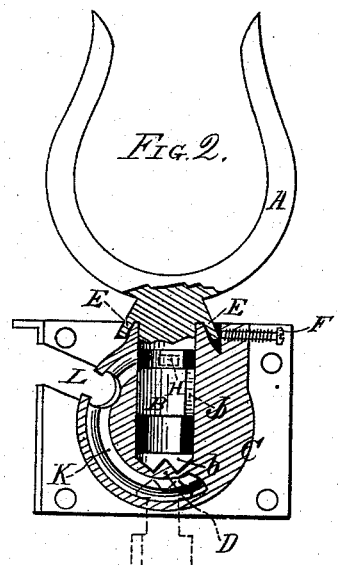

In the drawings, Figure 1 represents my improved rowlock in position for use. Fig. 2 is a vertical section, showing details of construction.

A is the fork to receive the oar, and B the shank or stem of the fork, which is inserted in the socket of the bracket C. The term "fork" in this description will include both the prongs A and the shank B. The bracket has a horizontal part, $c$, which rests on and is secured to the top of the gunwale, while the part C is fastened to the inner side thereof. The vertical socket in the bracket C is cast or reamed out of uniform diameter almost to the bottom, at which point it tapers conically toward the center, and terminates in a conical point, D. The shank fits the socket snugly at its upper part, and again at the bottom, where it is formed with a bulb, $b$, tapering downwardly to the base of the cone D, which it receives in a corresponding recess.

At the intersection of the shank with the prongs of the fork I form, integral with both, an annular collar, E, tapering downwardly and outwardly, and bearing upon a conical portion of the bracket surrounding socket, which gives, like the parts at the base of the socket, a bearing upon which the peculiar friction and wear incident to the act of rowing are equally distributed over a large surface, and since the wear at top and bottom of the shank is upon tapering surfaces which approach each other as they wear away vertically, there is no tendency to work loose in the bearings or wear unequally.

F is a set-screw passing through a projection, G, of the bracket, its point arranged to bear against the outside of the collar E, and thus furnish its support from without. This construction also tends to prevent the shank from working upward or becoming detached from the socket.

On one side of the shank there is a vertical groove, J, extending from the collar to the bulb, and within the socket there is a stud, H, projecting inwardly, to occupy a position in this groove and act as a stop to prevent the bulb from passing out of the socket. The shank may be lifted vertically, by reason of this groove, until the bulb strikes the stud H, which stops the movement and prevents loss of the fork or movable part of the apparatus. The stop also obviates a tendency of the shank to rise in the socket when rowing, especially in rough weather, because the body of the shank is enlarged below the stop, and can only rise when turned so that the groove J coincides with the stop, which never occurs when the oars are in the fork in position for rowing.

To remove the fork from its vertical position in the socket I provide a channel, K, leading from the upper part of the bracket around to its lower part, about as shown, having just sufficient size to permit the bulb $b$ to traverse it, and formed with a narrow slot opening outwardly, adapted for the passage of the neck or slender part of the shank, but too narrow to permit the bulb to pass out. With this construction the fork may be swung around radially into the position indicated in Fig. 2, so as to leave the gunwale unobstructed, without danger of losing the fork. It is obvious the channel K may extend in right lines horizontally and vertically or obliquely, instead of being curved; but I prefer the arrangement shown in the drawings.

When the stop H is cast with or permanently affixed to the bracket it is desirable to provide a way for the bulb to enter the socket without grooving through the bulb to enable it to pass the stop, and subsequently restoring the bulb by filling its groove with solder or otherwise. To this end I sometimes cut away the bracket, as at L, on one side of the channel K, so that the bulb may enter it readily, as indicated in Fig. 2. By making this incision in the back side of the bracket, which comes next to the gunwale, the parts of my device may be readily united before the bracket is secured in position, and cannot subsequently disengage unless the wood is cut away for the purpose, or the bracket removed.

I claim as my improvement in rowlocks—

1. The combination of a bracket having a tapering bearing outside of the socket with a fork having a correspondingly-tapering collar or annulus surrounding the shank, substantially as set forth.

2. A fork having a bulb on the lower extremity of its shank tapering conically, in combination with a bracket provided with a socket having at its base a correspondingly-tapering bearing-surface, substantially as set forth.

3. The combination of a bracket having a socket to receive the shank and provided with a stud or stop, as described, with a fork having a grooved body or shoulder adapted to engage with the stop, to prevent the fork from rising when in position for rowing, and a bulb or head too large to pass said stop, substantially as set forth.

4. A fork provided with a bulb on its lower end, in combination with a bracket having a socket for the shank to work in and a slotted channel, K, adapted for the bulb and shank to traverse when both bulb and shank are wholly removed from the working-socket, substantially as set forth.

5. The combination of a fork having a bulb at its lower end with a bracket having a socket closed in front for the shank to work in, a stop, and a slotted channel, distinct from the socket in which the shank works, whereby the fork may be reversed, substantially as set forth.

THOMAS DOWLING.

Witnesses:
A. H. SPENCER,
C. G. KEYES.